Patented Nov. 18, 1941

2,263,305

UNITED STATES PATENT OFFICE 2,263,305

METHOD OF IMPROVING THE ADHESION OF RUBBER TO FIBROUS MATERIALS

Edward T. Lessig and Ivan Gazdik, Akron, Ohio, assignors to The B. F. Goodrich Company, New York, N. Y., a corporation of New York No Drawing. Application November 16, 1939, Serial No. 304,782

6 Claims. (Cl. 154—40)

The invention relates to the manufacture of composite products comprising rubber and fibrous material in adhering relation and is particularly concerned with improving the adhesion of rubber to fibrous materials such as cotton, ramie, silk, artificial silk, or the like in the form of cords, fabrics and similar fibrous structures.

In the present day manufacture of certain rubber goods which are to be subjected to severe service conditions, it has been found desirable to incorporate cords, fabrics, and similar fibrous structures with the rubber in order to give added strength to withstand the severe service. Because of the reinforcing action of these fibrous structures, the length of meritorious service of the rubber goods is to a considerable extent dependent upon the degree of adhesion that is obtained between the rubber and the fibers. If the adhesion is slight the brunt of the load will necessarily be applied to the rubber instead of to the fibers. This will cause breaking of the rubber, extreme elongation, and general breakdown of the entire article. It is accordingly the object of this invention to provide a method whereby improvement in adhesion between rubber and fibrous reinforcing elements may be obtained and to provide superior composite products embodying rubber and fibrous reinforcing elements in strongly adhering relation.

We have discovered that by treating fibrous materials with an organic compound such as poly 2,2,4-trimethyl 1,2-dihydro quinoline the adhesion of said cords and fabrics to rubber is improved, in the average case around 30%, over the untreated materials when similarly incorporated in a rubber article such as a tire in the customary manner. Such treatment also serves to improve the resistance of the cord or fabrics to repeated flexures.

The usual procedure of applying the poly 2,2,4-trimethyl 1,2-dihydro quinoline to the fibrous materials is to dissolve the desired amount in a suitable solvent, such as benzene or, if preferred, the adhesion enhancing material may be dissolved in a small amount of solvent and the solution then dispersed in water. The fibers are coated with such solutions or dispersions by spraying, dipping or any similar operation. Any amount of the poly 2,2,4-trimethyl 1,2-dihydro quinoline may be employed, but usually 2% to 20% is used based upon the total amount of liquid carrier used.

In a specific embodiment of the invention, cotton tire cord is immersed in a 5% solution of poly 2,2,4-trimethyl 1,2-dihydro quinoline in benzene, removed from the solution, and then dried under tension sufficient to stretch the cord to about its original length. This treated cord is then utilized in the production of rubberized weftless fabric for tires in the usual manner by calendering an unvulcanized rubber composition upon a number of parallel cords. Tire plies are then cut from the sheet of rubberized fabric and built into a tire, and the tire is vulcanized. Superior tire life results from the definitely improved adhesion between the rubber and cords in the tire carcass and from the improved flex-resistance of the cords.

Having herein described a preferred embodiment of our invention, it is our desire to protect it broadly limited only by the spirit and scope of the appended claims.

We claim:

1. A composite product comprising rubber and fibrous material in adhering relation, said fibrous material containing on its surface poly 2,2,4-trimethyl 1,2-dihydro quinoline.

2. A composite product comprising rubber and a reinforcing element of cotton in adhering relation, said cotton containing on its surface poly 2,2,4-trimethyl 1,2-dihydro quinoline.

3. A tire comprising rubber and a reinforcing element of cords in adhering relation, said cords containing on the surface of their fibers poly 2,2,4-trimethyl 1,2-dihydro quinoline.

4. In a method of making a composite product comprising rubber and fibrous material in adhering relation, the steps comprising treating the fibrous material with poly 2,2,4-trimethyl 1,2-dihydro quinoline, associating the treated fibrous material with unvulcanized rubber, and vulcanizing the rubber, whereby improved adhesion between the rubber and fibrous material is obtained.

5. In a method of making a composite product comprising rubber and cotton material in adhering relationship, the process which comprises the steps of wetting the cotton material with a liquid composition containing poly 2,2,4-trimethyl 1,2-dihydro quinoline, drying the wetted cotton material, associating the treated cotton material with unvulcanized rubber, and vulcanizing the rubber, whereby improved adhesion between the rubber and the cotton material is obtained.

6. In a method of making a composite product comprising rubber and cotton cord in adhering relation, the process which comprises the steps of wetting the cord with a liquid composition containing poly 2,2,4-trimethyl 1,2-dihydro quinoline, drying the cord under tension, associating the treated cotton cord with unvulcanized rubber, and vulcanizing the rubber, whereby improved adhesion between the rubber and the cord is obtained.

EDWARD T. LESSIG.
IVAN GAZDIK.